US007953886B2

(12) United States Patent
Bansal et al.

(10) Patent No.: US 7,953,886 B2
(45) Date of Patent: May 31, 2011

(54) METHOD AND SYSTEM OF RECEIVING AND TRANSLATING CLI COMMAND DATA WITHIN A ROUTING SYSTEM

(75) Inventors: Anil Bansal, Fremont, CA (US); Jung Tjong, Sunnyvale, CA (US); Prakash Bettadapur, San Jose, CA (US); Sastry Varanasi, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 693 days.

(21) Appl. No.: 11/178,136

(22) Filed: Jul. 8, 2005

(65) Prior Publication Data
US 2007/0011348 A1 Jan. 11, 2007

(51) Int. Cl.
G06F 15/173 (2006.01)
(52) U.S. Cl. ...................................................... 709/238
(58) Field of Classification Search .......... 709/223–226, 709/238
See application file for complete search history.

(56) References Cited

U.S. PATENT DOCUMENTS

| | | | |
|---|---|---|---|
| 5,778,223 A | 7/1998 | Velissaropoulos et al. | |
| 6,278,455 B1 | 8/2001 | Baker | |
| 6,457,173 B1 | 9/2002 | Gupta et al. | |
| 6,553,366 B1 | 4/2003 | Miller et al. | |
| 6,675,370 B1 | 1/2004 | Sundaresan | |
| 6,697,967 B1 * | 2/2004 | Robertson | 714/43 |
| 6,724,409 B1 | 4/2004 | Maddocks | |
| 6,738,781 B1 | 5/2004 | Mustoe | |
| 6,744,433 B1 | 6/2004 | Bastos et al. | |
| 6,907,572 B2 * | 6/2005 | Little et al. | 715/762 |
| 6,954,790 B2 | 10/2005 | Forslow | |
| 6,959,329 B2 * | 10/2005 | Thakor | 709/220 |
| 6,959,332 B1 | 10/2005 | Zavalkovsky et al. | |
| 7,054,901 B2 | 5/2006 | Shafer | 709/203 |
| 7,054,924 B1 * | 5/2006 | Harvey et al. | 709/220 |
| 7,058,699 B1 | 6/2006 | Chiou et al. | |
| 7,072,946 B2 | 7/2006 | Shafer | 709/217 |
| 7,072,985 B1 * | 7/2006 | Lev-Ami et al. | 709/246 |
| 7,149,738 B2 * | 12/2006 | Kumar et al. | 707/9 |
| 7,200,548 B2 * | 4/2007 | Courtney | 703/27 |
| 7,321,929 B2 | 1/2008 | Rolfe | |
| 2002/0198974 A1 | 12/2002 | Shafer | |
| 2003/0033589 A1 | 2/2003 | Reyna | |
| 2003/0046370 A1 | 3/2003 | Courtney | |
| 2003/0048287 A1 * | 3/2003 | Little et al. | 345/705 |
| 2003/0051008 A1 * | 3/2003 | Gorthy et al. | 709/220 |

(Continued)

OTHER PUBLICATIONS

Sun Management Center 3.6.1 User's Guide (Chapter 20 only); Sun Microsystems; May 2006.*

(Continued)

Primary Examiner — Kenny S Lin
Assistant Examiner — Farhad Ali
(74) Attorney, Agent, or Firm — Stolowitz Ford Cowger LLP

(57) ABSTRACT

A method and system of receiving and translating data using an internetwork operating system (IOS) command line interface (CLI) parser subsystem of a routing system are shown. Input is received at the IOS CLI parser subsystem. The input is traversed. Where the input originates from outside of the router, the input is translated into a corresponding CLI statement. Where the input originates from within the router, the input is translated into a prescribed output format. The translated input is output.

15 Claims, 4 Drawing Sheets

Routing System 100

U.S. PATENT DOCUMENTS

| | | | |
|---|---|---|---|
| 2003/0101240 A1* | 5/2003 | Courtney | 709/220 |
| 2004/0040016 A1* | 2/2004 | Pearce et al. | 717/141 |
| 2004/0078457 A1* | 4/2004 | Tindal | 709/223 |
| 2004/0090439 A1 | 5/2004 | Dillner | |
| 2004/0117452 A1* | 6/2004 | Lee et al. | 709/208 |
| 2004/0168124 A1 | 8/2004 | Beisiegel et al. | |
| 2004/0205562 A1* | 10/2004 | Rozek et al. | 715/513 |
| 2005/0021502 A1 | 1/2005 | Chen et al. | |
| 2005/0091068 A1* | 4/2005 | Ramamoorthy et al. | 705/1 |
| 2006/0031427 A1* | 2/2006 | Jain et al. | 709/220 |
| 2006/0080425 A1* | 4/2006 | Wood et al. | 709/223 |
| 2006/0129980 A1* | 6/2006 | Schmidt et al. | 717/114 |
| 2006/0230378 A1 | 10/2006 | Waddington et al. | |
| 2006/0242403 A1 | 10/2006 | Joshi et al. | |

OTHER PUBLICATIONS

Using the Command-Line Interface in Cisco IOS and Cisco IOS XE Software; Cisco Systems; Last Updated Mar. 5, 2009.*

Network Appliance, Inc.; Netcache Command Line Interface; 1999-2000; www.billfernandez.com/bfdz/portfolio/netcache_cli/idex.htm; 2 Pages.

Allegro Software Development Corp.; Rom CLE Embedded Command Line Interface (CLI) Toolkits; www.allegrosoft.com/momcli.html; 3 Pges.

Matuska, Miroslav; IOAConvert: IOS to XML Router Configuration File Converter—Command Reference, CESNET Technical Report No. 30/2003; Oct. 12, 2003; 36 Pages.

Stolowitz Ford Cowger LLP, Related Case Listing; Nov. 11, 2009; 1 Page.

* cited by examiner

Flowchart 300

METHOD AND SYSTEM OF RECEIVING AND TRANSLATING CLI COMMAND DATA WITHIN A ROUTING SYSTEM

BACKGROUND

1. Field of the Invention

The present invention relates to routing systems for computer networks, and more particularly to the transmission of instructions to and receipt of data from such routing systems.

2. Related Art

Access and configuration of a routing system involves sending commands and instructions to and receiving information from the router itself. For routers using a version of the internetwork operating system (IOS), access is accomplished through the use of the IOS command line interface (CLI). IOS CLI is a comprehensive interface, which has expanded continuously as technology has improved over the past twenty years. Many companies now strive to support some variation on IOS CLI in their routing systems, and many consumers have invested heavily in IOS CLI support, developing complicated scripts to handle various configuration and access needs. As such, it is desirable for any improvements to router access and control to acknowledge the existing investments of consumers.

IOS CLI is not the most program-friendly of interfaces, however. Twenty years of consistency and backwards-compatibility, when coupled with consistent improvements to the hardware and implementation of new features, has created an extensive interface. While a human user of IOS CLI may be able to sort through the complicated input and output scheme to input information and extract important data, it has proven to be a very difficult and cumbersome task to automate.

A system and/or method that allows for an easy, more structured approach to accessing and configuring a router, while still making use of the significant advantages and experience associated with IOS CLI, would be advantageous.

DETAILED DESCRIPTION

Figure 1:
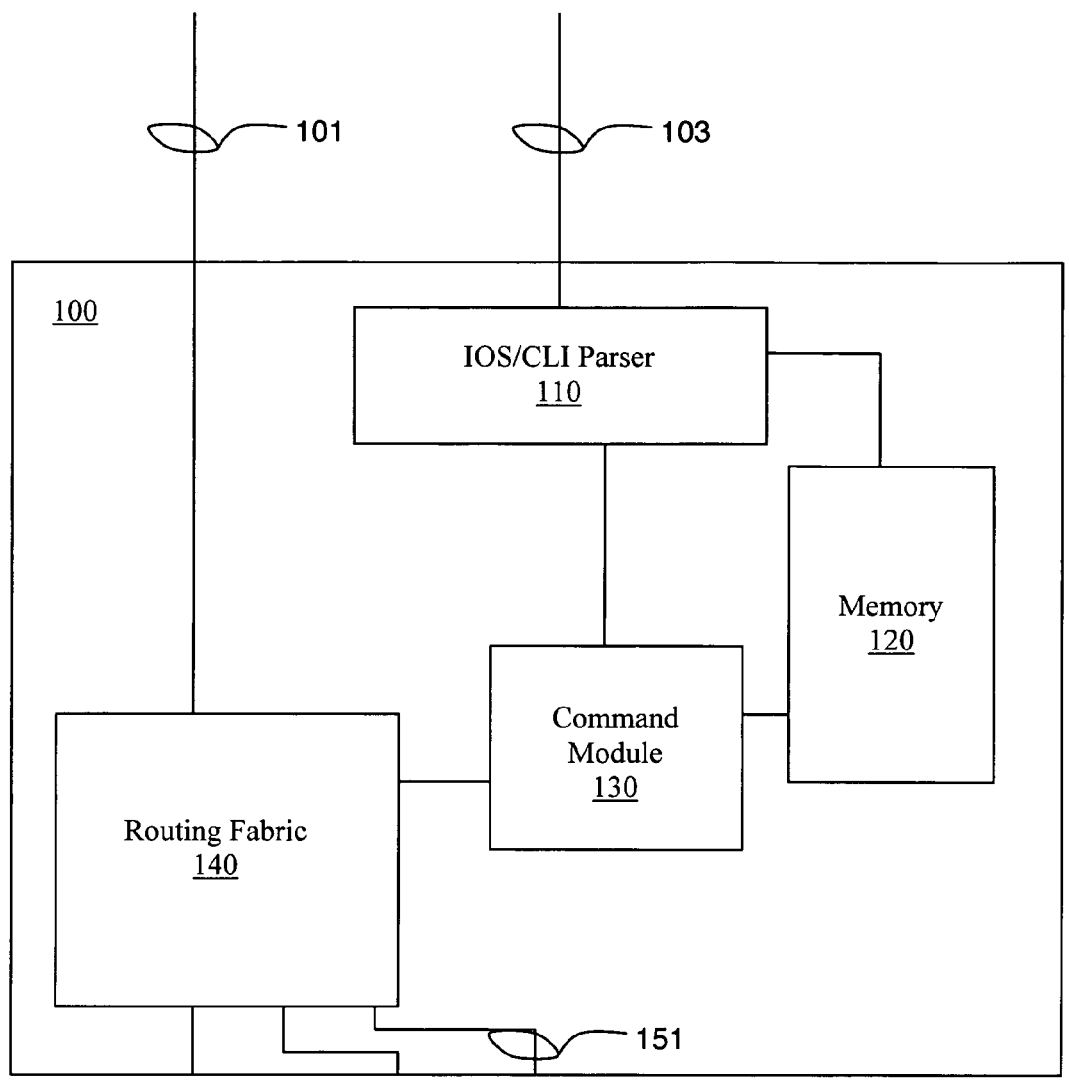
FIG. 1 depicts a block diagram of an exemplary routing system, in accordance with one embodiment of the present invention.

A method of receiving and translating data using an internetwork operating system (IOS) command line interface (CLI) parser subsystem of a routing system, and a routing system incorporating that method, are disclosed. Reference will now be made in detail to several embodiments of the invention. While the invention will be described in conjunction with the alternative embodiment(s), it will be understood that they are not intended to limit the invention to these embodiments. On the contrary, the invention is intended to cover alternative, modifications, and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

NOTATION AND NOMENCLATURE

Some portions of the detailed descriptions, which follow, are presented in terms of procedures, steps, logic blocks, processing, and other symbolic representations of operations on data bits that can be performed on computer memory, such as a computer-usable medium. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "testing," "using," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

With reference now to FIG. 1, a block diagram of a routing system 100 is depicted, in accordance with one embodiment of the invention. It is appreciated that the present invention is readily implemented in a variety of routing and/or switching configurations. Routing system 100 includes IOS/CLI Parser 110, Memory 120, Command Module 130, Routing Fabric 140, input port 101, programming port 103, and several output ports 151. Command Module 130 is coupled to IOS/CLI Parser 110, Memory 120, and Command Module 130. It is appreciated that the present invention is readily adaptable for utilization in systems of various configurations, including systems with varying numbers of ports. In one embodiment, input port 101 and programming port 103 might be combined into a single port. Moreover, differing types of input ports are used in different embodiments: direct physical terminal console ports are used in one embodiment for interactive human users; another embodiment supports the use of remote terminal protocols, such as SSH and telnet, for remote administration; a third embodiment allows for receipt of input as a batch process. No one type of input port is preferred for the utilization of this invention. One embodiment includes three output ports 151; another embodiment might use differing quantities. Similarly, another embodiment of a routing system may used separate memory for the IOC CLI parser and the processor.

The components of routing system 100 cooperatively operate to route or otherwise distribute signals received, pursuant to instructions received from a user. A user need not be an actual person; command statements may be issued automatically by an outside program, which would be considered a "user" as well. It is appreciated that the term "command statements" is intended to be exemplary only; other types of statements, such as requests for information, are also received by routing system 100 and are treated in similar fashion. In one embodiment, such command statements are received by routing system 100 through programming port 103, and are passed to IOS/CLI Parser 110. In one embodiment of the present invention, these command statements may be formatted in accordance with the CLI rules and behaviors expected by IOS/CLI Parser 110, or in accordance with an XML schema of the CLI rules and behaviors. In another embodiment, these command statements can be formatted in accordance with another set of rules and behaviors, or presented in a language other than XML or CLI. Once received by IOS/CLI Parser 110, the command statements are parsed according to instructions programmed into IOS/CLI Parser 110. Alternatively, the command statements can be parsed in accordance with a model of the CLI command structure stored in Memory 120. Non-CLI command statements must also be translated into CLI statements that Command Module 130 can interpret.

Once the command statements have been parsed and translated, according to one embodiment, they are passed to Command Module 130. Command Module 130 acts upon the received command statements in accordance with instructions and data stored in Memory 120. When the command statements call for a response from routing system 100, such as an acknowledgement of an altered setting or information regarding the performance of routing system 100, a response statement is returned to IOS/CLI Parser 110.

In one embodiment, such a response statement would be received from Command Module 130 in CLI. IOS/CLI Parser 110 would translate the CLI response into an XML response in accordance with an XML schema of the CLI rules and behaviors. In other embodiments, a response statement could be translated in accordance with a different set of rules or behaviors, or outputted in languages other than XML.

Command Module 130 receives ingress or input information on through input port 101, and routes it to an appropriate output port 151. The information flow through Command Module 130 is directed by Command Module 130 based upon directions stored in Memory 120 or received through programming port 103, as detailed above. p103 also directs scheduling of information flows through routing system 100.

Figure 2:
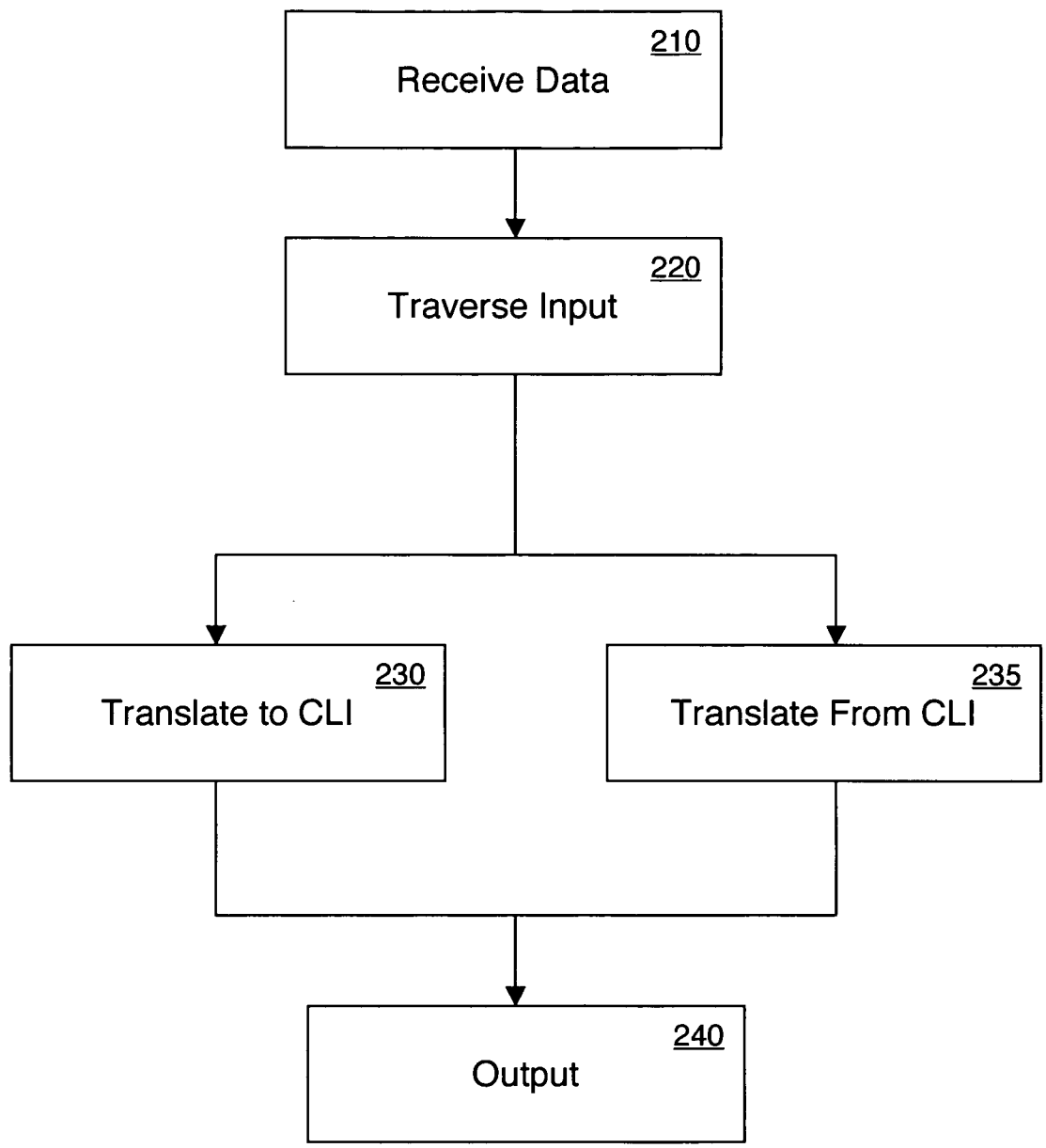
FIG. 2 is a flowchart of a method for receiving and translating data using an internetwork operating system (IOS) command line interface (CLI) parser subsystem of a routing system, in accordance with one embodiment of the present invention.

With reference now to FIG. 2, a flowchart 200 of a method for receiving and translating data using an IOS CLI parser subsystem of a routing system is depicted, in accordance with one embodiment of the invention. Although specific steps are disclosed in flowchart 200, such steps are exemplary. That is, embodiments of the present invention are well suited to performing various other (additional) steps or variations of the steps recited in flowchart 200. It is appreciated that the steps in flowchart 200 may be performed in an order different than presented, and that not all of the steps in flowchart 200 may be performed.

In step 210 of flowchart 200, in one embodiment, input data is received at the IOS/CLI Parser 110 of a routing system 100. In one embodiment, this input may originate from outside the routing system 100, and be passed to the IOS/CLI Parser 110 by way of programming port 103. In another embodiment, the input may originate from inside the routing system 100, and be passed to the IOS/CLI Parser 110 from Command Module 130; in one embodiment, such input is a representation of the current configuration settings of routing system 100. This input data can take the form of CLI statements. Alternatively, the input can be formatted in accordance with another language syntax; one embodiment calls for input to be formatted in accordance with a specific XML schema of the CLI syntax.

In step 220 of flowchart 200, in one embodiment, the input received in step 210 is traversed. During traversal, the source of the data can be ascertained (e.g. whether the input originated from inside or outside routing system 100). This determination affects what operations are performed on the input, as is explained in greater depth with reference to FIGS. 3 and 4, below.

In step 230 of flowchart 200, in one embodiment, when the input received in step 210 originated from outside of routing system 100, the input is translated into CLI statements. According to one embodiment, the input was originally formatted according to an XML schema of the CLI rules and behaviors. In other embodiments, the input might be received in a different language and translated into CLI. Greater explanation of this transformative behavior is explained with reference to FIG. 3, below.

In step 235 of flowchart 200, in one embodiment, when the input received in step 210 originated from inside or routing system 100, the input is translated from CLI statements into a different format. According to one embodiment, the CLI statements would be translated into corresponding XML statements, in accordance with an XML schema of the CLI rules and behaviors. In other embodiments, the input would be translated into other desirable output formats. Greater explanation of this transformative behavior is explained with reference to FIG. 4, below.

In step 240 of flowchart 200, in one embodiment, the output of steps 230 or 235 is passed along. In the case of step 230, the transformed input is passed to Command Module 130 within routing system 100 for further action, now that it is in CLI format. In the case of step 235, the transformed input is passed to programming port 103, where it leaves routing system 100.

Figure 3:
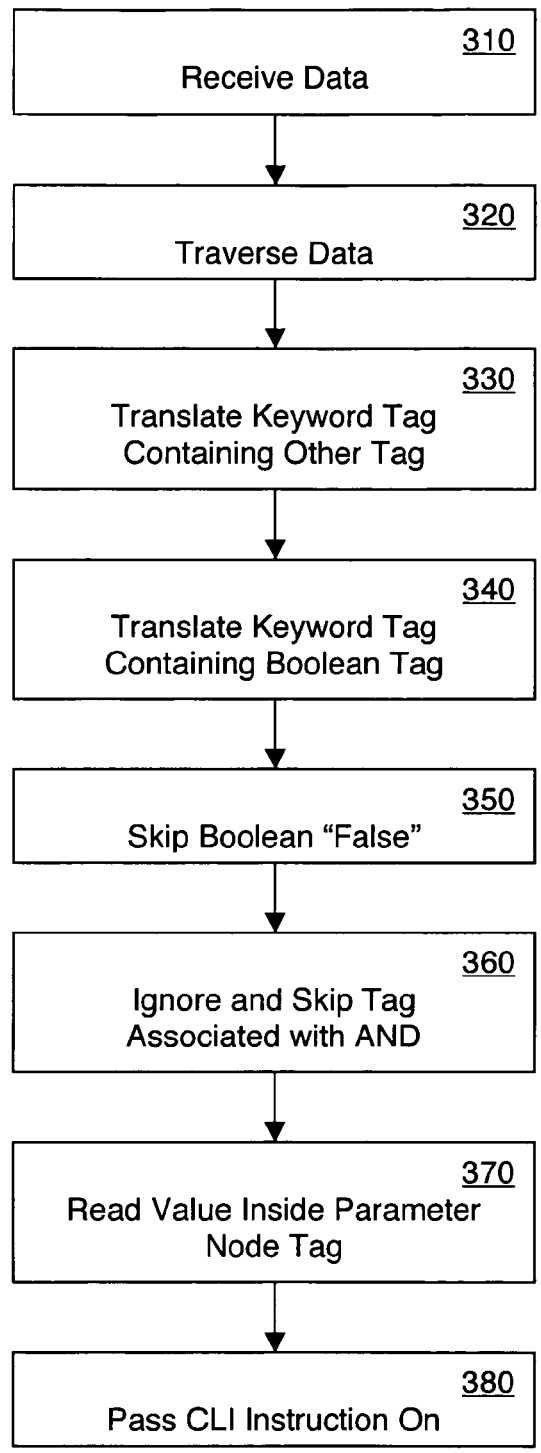
FIG. 3 is a flowchart of a method for receiving XML statements into an IOS CLI parser subsystem of a routing system and translating the XML statements into CLI commands, in accordance with one embodiment of the present invention.

With reference now to FIG. 3, a flowchart 300 of a method for receiving XML statements into an IOS CLI parser subsystem of a routing system and translating the XML statements into CLI commands, in accordance with one embodiment of the present invention. Although specific steps are disclosed in flowchart 300, such steps are exemplary. That is, embodiments of the present invention are well suited to performing various other (additional) steps or variations of the steps recited in flowchart 300. It is appreciated that the steps in flowchart 300 may be performed in an order different than presented, and that not all of the steps in flowchart 300 may be performed.

In step 310 of flowchart 300, in one embodiment, input data is received at the IOS/CLI Parser 110 of a routing system 100. In this embodiment, this input originates from outside the routing system 100, and is passed to the IOS/CLI Parser 110 by way of programming port 103. In this embodiment, the input is formatted in accordance with a specific XML schema of the CLI syntax. This schema minimizes the translation required from XML to CLI by requiring all existing CLI rules and behaviors to be followed by the XML schema, e.g. the sequencing of commands within an XML request must follow CLI configuration rules. XML tags consist of CLI keywords, with some additional tags for command parameters. An example of input formatted in accordance with one XML schema is presented in Table 1, below.

TABLE 1

```
<add>
<k_mpls_label>
<k_range>
<range-min>10</range-min>
    <range-max>300</range-max>
<k_static>
    <static-min>30</static-min>
    <static-max>150</static-max>
</k_static>
</k_range>
</k_mpls_label>
</add>
```

In step 320 of flowchart 300, in one embodiment, the input received in step 310 is traversed. In this embodiment, where the input is formatted in accordance with a specific XML schema of the CLI syntax, this step includes traversing the XML fragments associated with each XML Command from top to bottom.

In step 330 of flowchart 300, in one embodiment, each XML tag has the following rule applied to it. If an XML keyword tag contains another keyword, it is translated into one or more CLI keywords. Multiple CLI keywords may have been concatenated into a single XML tag delimited by a character, such as the underscore character "_"; in such cases, the keywords are extracted from the tag and translated into multiple CLI keywords.

In step 340 of flowchart 300, in one embodiment, each XML tag has the following rule applied to it. If an XML keyword tag contains the boolean value "true", it is translated into the associated CLI keyword.

In step 350 of flowchart 300, in one embodiment, each XML tag has the following rule applied to it. If an XML keyword tag contains the boolean valude "false", it is skipped.

In step 360 of flowchart 300, in one embodiment, each XML tag has the following rule applied to it. If an XML keyword tag is associated with an AND node, it is ignored and skipped; such tags are identifiable through naming conventions.

In step 370 of flowchart 300, in one embodiment, each XML tag has the following rule applied to it. If an XML keyword tag is a parameter node tag, the values inside the tag are extracted.

In step 380 of flowchart 300, in one embodiment, the translated CLI command statement is passed on. In one embodiment, the translated CLI command statement is passed to command module 130 to be acted upon in accordance with the rules and behaviors associated with CLI. An example of a translated CLI command is presented below, in Table 2. This is the result of translating the example input from Table 1, above, into CLI.

TABLE 2 mpls label range 10 300 static 30 150

Figure 4:
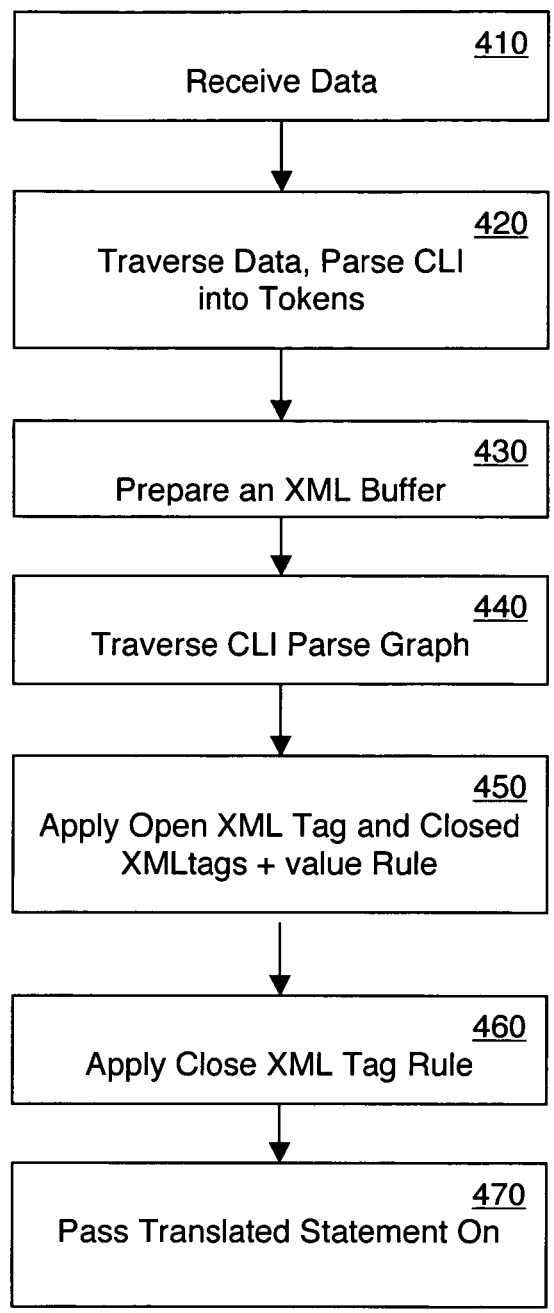
FIG. 4 is a flowchart of a method for receiving CLI input into an IOS CLI parser subsystem of a routing system and translating the input into XML statements, in accordance with one embodiment of the present invention.

With reference now to FIG. 4, a flowchart 400 of a method for receiving CLI statements into an IOS CLI parser subsystem of a routing system and translating the CLI statements into XML statements, in accordance with one embodiment of the present invention. Although specific steps are disclosed in flowchart 400, such steps are exemplary. That is, embodiments of the present invention are well suited to performing various other (additional) steps or variations of the steps recited in flowchart 400. It is appreciated that the steps in flowchart 400 may be performed in an order different than presented, and that not all of the steps in flowchart 400 may be performed.

In step 410 of flowchart 400, in one embodiment, input data is received at the IOS/CLI Parser 110 of a routing system 100. In this embodiment, this input originates from inside the routing system 100, and is passed to the IOS/CLI Parser 110 from command module 130. In this embodiment, the input is formatted in accordance with the CLI syntax, and is to be translated into a specific XML schema of the CLI syntax. This schema minimizes the translation required from CLI to XML by requiring all existing CLI rules and behaviors to be followed by the XML schema, e.g. the sequencing of commands within an XML request must follow CLI configuration rules. XML tags consist of CLI keywords, with some additional tags for command parameters.

In step 420 of flowchart 400, in one embodiment, the input received in step 410 is traversed. The CLI statements are parsed into tokens.

In step 430 of flowchart 400, in one embodiment, the IOS CLI parser also prepares an XML buffer in memory 120.

In step 440 of flowchart 400, in one embodiment, each CLI token has the following rule applied to it. The CLI parse graph stored in memory 120 is traversed, with respect to each token. In this embodiment, the parse graph has been modified slightly from preceding implementations, to add additional information to IOS parse node types that represent CLI keywords and parameters. In the case of keyword nodes, the following information is added: "parent_label," which is a label given to AND nodes; "is_boolean," which is true if the keyword is a boolean value; and "has_more_tag," which is true if the keyword is to be merged with the next keyword. In the case of parameter nodes, the following is added: "label," the label given to parameter nodes; and "parent_label," which is a label given to AND nodes.

In step 450 of flowchart 400, in one embodiment, each CLI token has the following rule applied to it. The "Open XML Tag and Closed XML tags+Value" rule, presented below in Table 3, assembles an XML statement from modified CLI tokens, placing the tokens in the XML buffer and adding characters as required to conform to the XML schema implemented.

TABLE 3

Open XML Tag and Closed XML tags + Value Rule
Open XML Tag is introduced by:
    Non-boolean value keyword parse node
    Keyword or parameter node's parent_label
For Parameter node:
    Add "<" to XML buffer
    Add parameter node's label string to XML buffer
    Add ">" to XML buffer
    Add parameter node's value to XML buffer
    Add "</" to XML buffer
    Add parameter node's label string to XML buffer
    Add ">" to XML buffer
For boolean keyword node (is_boolean is true)
    Add "<" to XML buffer
    Add keyword string to XML buffer
    Add ">true</" to XML buffer
    Add keyword string to XML buffer TABLE 3-continued

```
        Add ">" to XML buffer
For non-boolean keyword node
    if (last character in buffer is not "_") {
        Add "_" to XML buffer
    } else (keyword's has__more__tag is false) {
        Add ">" to XML buffer
    }
}
```

In step 460 of flowchart 400, in one embodiment, each CLI token has the following rule applied to it. The "Close XML tag" rule is used to determine when to close an open XML tag to stop the nesting and move back up the hierarchy. In this embodiment, the rule has two conditions, either of which may be satisfied: reaching the End of Line (EOL), or the token's "parent_label" is different from the preceding node's "parent_label" will close an open XML tag.

In step 470 of flowchart 400, in one embodiment, the translated XML statement will leave IOS CLI parser 110. In one embodiment, the translated XML statement will be returned to the user via programming port 103.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:
receiving, with a command line interface (CLI) parser, an input command configured to request an operation be performed by a routing system, wherein the input command is configured in an extensible markup language (XML) format having a CLI syntax with CLI keywords sequenced according to configuration rules for CLI commands;
translating, with the CLI parser, the input command from the XML format having the CLI syntax into a CLI command that, when executed, is configured to prompt the routing system to perform the operation, wherein the translating of the input command into the CLI command includes identifying at least one XML tag that includes an XML parameter to indicate the XML tag includes one or more CLI keywords, extracting the one or more CLI keywords from the input command, and arranging the one or more CLI keywords into the CLI command according to the CLI syntax of the input command, wherein the routing system is configured to perform the operation responsive to the execution of the CLI command;
translating an output message, generated in response to performance of the operation, from a CLI format into an XML format having the CLI syntax, wherein the translating includes parsing the output message to identify at least one CLI token, translating each CLI token of the output message into a corresponding XML value according to a stored mapping of CLI tokens-to-XML values, and generating the output message in the XML format with the XML values; and
transmitting the output message in the XML format having the CLI syntax to a remote device external from the routing system.

2. The method of claim 1, wherein the input command is formatted in accordance with an XML schema of CLI rules and behaviors enforced by an internetwork operating system (IOS) command line interface (CLI) parser subsystem.

3. The method of claim 2, wherein the translation of the input command from XML format having a CLI syntax into a CLI command comprises:
parsing the input command to identify an XML command attribute;
traversing the input after the XML command attribute to identify any keywords and any parameters associated with the XML command attribute;
translating the XML command attribute into the CLI command; and
translating the keywords and any parameters into associated attributes of the CLI command.

4. The method of claim 1, wherein the output message in the XML format having the CLI syntax includes data formatted in accordance with an XML data model of CLI rules and behaviors enforced by an internetwork operating system (IOS) command line interface (CLI) parser subsystem.

5. The method of claim 1, wherein the translation of the output message from the CLI format into the XML format having the CLI syntax comprises:
parsing the output message to identify at least one CLI token;
accessing a stored mapping of CLI tokens-to-XML values;
translating each CLI token of the output message into a corresponding XML value, in accordance with said stored mapping; and
generating the output message in the XML format having the CLI syntax with the XML values.

6. A computer-usable memory device having computer-readable program code embedded therein for causing a computer system to:
receive an input command requesting an operation be performed by a routing system, wherein the input command is configured in an extensible markup language (XML) format having a command line interface (CLI) syntax with CLI keywords sequenced according to configuration rules for CLI commands;
translate the input command from the XML format having the CLI syntax into a CLI command, wherein the routing system is configured to execute the CLI command and perform the operation, and wherein the computer system is further configured to translate the input command by identifying at least one XML tag that includes an XML parameter to indicate the XML tag includes one or more CLI keywords, extracting the one or more CLI keywords from the input command, and arranging the one or more CLI keywords into the CLI command according to the CLI syntax of the input command;
translate an output message from a CLI format into XML format having the CLI syntax, wherein the output message is generated in the CLI format by the routing system responsive to the performance of the operation, and wherein the translating includes parsing the output message to identify at least one CLI token, translating each CLI token of the output message into a corresponding XML value according to a stored mapping of CLI tokens-to-XML values, and generating the output message in the XML format with the XML values; and transmit the output message in the XML format having the CLI syntax to a remote device external from the routing system.

7. The computer-usable memory device of claim 6, wherein the input command is formatted in accordance with an XML schema of CLI rules and behaviors enforced by an internetwork operating system (IOS) command line interface (CLI) parser subsystem.

8. The computer-usable memory device of claim 7, wherein the translation of the input command from XML format having a CLI syntax into a CLI command comprises:
   parsing the input command to identify an XML command attribute;
   traversing the input after the XML command attribute to identify any keywords and any parameters associated with the XML command attribute;
   translating the XML command attribute into the CLI command; and
   translating the keywords and any parameters into associated attributes of the CLI command.

9. The computer-usable memory device of claim 6, wherein the output message in the XML format having the CLI syntax includes data formatted in accordance with an XML data model of CLI rules and behaviors enforced by an internetwork operating system (IOS) command line interface (CLI) parser subsystem.

10. The computer-usable memory device of claim 6, wherein the translation of the output message from the CLI format into the XML format having the CLI syntax comprises:
   parsing the output message to identify at least one CLI token;
   accessing a stored mapping of CLI tokens-to-XML values;
   translating each CLI token of the output message into a corresponding XML value, in accordance with said stored mapping; and
   generating the output message in the XML format having the CLI syntax with the XML values.

11. A system comprising:
   an input port device to receive an input command requesting an operation be performed by a routing system, wherein the input command is configured in an extensible markup language (XML) format having a command line interface (CLI) syntax with CLI keywords sequenced according to configuration rules for CLI commands;
   means for translating the input command from the XML format having the CLI syntax into a CLI command by identifying at least one XML tag that includes an XML parameter to indicate the XML tag includes one or more CLI keywords, extracting the one or more CLI keywords from the input command, and arranging the one or more CLI keywords into the CLI command according to the CLI syntax of the input command;
   means for performing the operation responsive to the CLI command;
   means for generating an output message in a CLI format responsive to the performance of the operation;
   means for translating the output message from the CLI format into XML format having the CLI syntax, wherein the means for translating includes means for parsing the output message to identify at least one CLI token, means for translating each CLI token of the output message into a corresponding XML value according to a stored mapping of CLI tokens-to-XML values, and means for generating the output message in the XML format with the XML values; and
   means for transmitting the output message in the XML format having the CLI syntax to a remote device external from the routing system.

12. The system of claim 11, wherein the input command is formatted in accordance with an XML schema of CLI rules and behaviors enforced by an internetwork operating system (IOS) command line interface (CLI) parser subsystem.

13. The system of claim 12, wherein the means for translating of the input command from XML format having a CLI syntax into a CLI command comprises:
   means for parsing the input command to identify an XML command attribute;
   means for traversing the input after the XML command attribute to identify any keywords and any parameters associated with the XML command attribute;
   means for translating the XML command attribute into the CLI command; and
   means for translating the keywords and any parameters into associated attributes of the CLI command.

14. The system of claim 11, wherein the output message in the XML format having the CLI syntax includes data formatted in accordance with an XML data model of CLI rules and behaviors enforced by an internetwork operating system (IOS) command line interface (CLI) parser subsystem.

15. The system of claim 11, wherein the means for translating of the output message from the CLI format into the XML format having the CLI syntax comprises:
   means for parsing the output message to identify at least one CLI token;
   means for accessing a stored mapping of CLI tokens-to-XML values;
   means for translating each CLI token of the output message into a corresponding XML value, in accordance with said stored mapping; and
   means for generating the output message in the XML format having the CLI syntax with the XML values.

* * * * *